Jan. 2, 1968 B. CATANIA 3,361,986

LOW-DISTORTION SWEEP SIGNAL GENERATOR WITH
SUPERIMPOSED FREQUENCY MODULATION

Filed Oct. 20, 1966

INVENTOR.
BASILIO CATANIA

BY

Glenn H. Antrim

AGENT 3,361,986

LOW-DISTORTION SWEEP SIGNAL GENERATOR WITH SUPERIMPOSED FREQUENCY MODULATION

Basilio Catania, Milan, Italy, assignor to Automatic Electric Laboratories, Inc., a corporation of Delaware Filed Oct. 20, 1966, Ser. No. 588,165
4 Claims. (Cl. 331—30)

This invention relates to sweeping signal generators and more particularly to generators for providing sweeping signal over a wide range of frequencies and for superimposing on the swept signal a frequency-modulated signal of relatively high frequency, relatively low modulation index and low distortion. Generators of this type facilitate quick testing of amplitude and phase characteristics of transmission circuits over wide ranges of frequencies.

Presently, the field testing of frequency modulation transmission systems requires accuracy comparable to that performed formerly only in laboratories on systems when quality of transmission was not as stringest as it is now. Voice channels in telephone systems and particularly video channels require uniform frequency response, linearity, and freedom from echo that are maintained only by careful testing.

A set of equipment for performing accurate tests has usually included a conventional type sweeping signal generator and a frequency-modulated signal generator. The sweep generator, that supplies signals which are swept at a low-frequency rate over a wide-frequency band, is used to make reflection coefficient tests, gain tests, etc. The frequency-modulated signal generator, which can have its center frequency set and can be frequency-modulated at a rate within the normal rate of deviation of the signal that is usually transmitted over the circuit being tested is used to make group delay distortion (phase) tests and linearity tests. According to the present invention, a single generator supplies signal for making different tests that formerly required both types of generators mentioned above. The use of a single generator facilitates transportation to many different locations, including those remote from good roads, where routine and trouble-finding tests must be performed. The performance of the single generator is superior to that of separate generators in that certain tests can be performed simultaneously. The labor required for changing connections before performing different tests is saved, and in addition the possibility of erorrs in test results because of differences in calibration of the two generators is eliminated.

In order to overcome these disadvantages of using separate signal generators, equipment using circuits that differ from those of the present invention have already been suggested. For example, the use in a single signal generator having two different oscillators operating at much higher frequencies than the operating frequency (i.e., intermediate frequency of a transmission system) of the circuits being tested. The outputs of the two oscillators are applied to a mixer stage of the signal generator to develop in a conventional manner a difference-frequency signal for the output signal. One of the two oscillators is a sweeping oscillator, and the other oscillator is a signal oscillator modulated by a voice or video test signal. This arrangement has disadvantages which are not present in the signal generator described herein. The mixer causes an undesirable power loss and so adds to the output requirements of an associated power supply. Wide-band amplifiers required are likely to cause distortion in phase and amplitude. Furthermore, to obtain signal with frequencies high enough for required intermediate-frequency output signal, each of the two oscillators must operate in such a high frequency range that the klystron circuits that are conventionally used, are difficult to adjust and require high power input. Also, the required sweep range and the high degree of stability desired are difficult to achieve in klystron oscillators when operated at the required high frequencies.

An object of the present invention is to provide a single signal generator for supplying both sweep and frequency-modulated test signal for testing long-distance transmission circuits.

A feature of the signal generator is a feedback circuit, including a separate oscillator which is synchronously swept, for maintaining the frequency-modulated test signal constant over the sweep frequency range.

Briefly, the signal generator of this invention comprises first and second oscillators, a mixer, and a discriminator. The first oscillator has both a sweep signal input for sweeping the output of the first oscillator over a wide range of frequencies at a relatively slow rate and a test signal input for frequency modulating the output signal over a range and at a rate of a typical signal normally transmitted over a circuit under test. Both input signals may be applied simultaneously so that the frequency-modulated signal is superimposed upon the sweeping carrier signal. The second oscillator is part of a negative feedback circuit for reducing distortion in the output of the first oscillator. The sweep circuit of the second oscillator is synchronized with the sweep signal of the first oscillator so that a constant difference in frequency is maintained between the respective outputs of the oscillators. The outputs are connected to respective inputs of the mixer, and the output of the mixer is connected to the input of the discriminator. A frequency error signal proportional to the departure of the frequency difference between the outputs of the oscillators is applied from the output of the discriminator through a low-pass filter to a frequency-control circuit of the second oscillator, and the output of the discriminator is also applied in a negative feedback circuit through an amplifier and a bandpass filter to the test signal input of the first oscillator. This negative feedback circuit maintains frequency deviation at the test signal frequency very nearly constant throughout the sweeping frequency range of the first oscillator.

The invention may be more readily understood with reference to the accompanying drawing in which.

Figure 1:
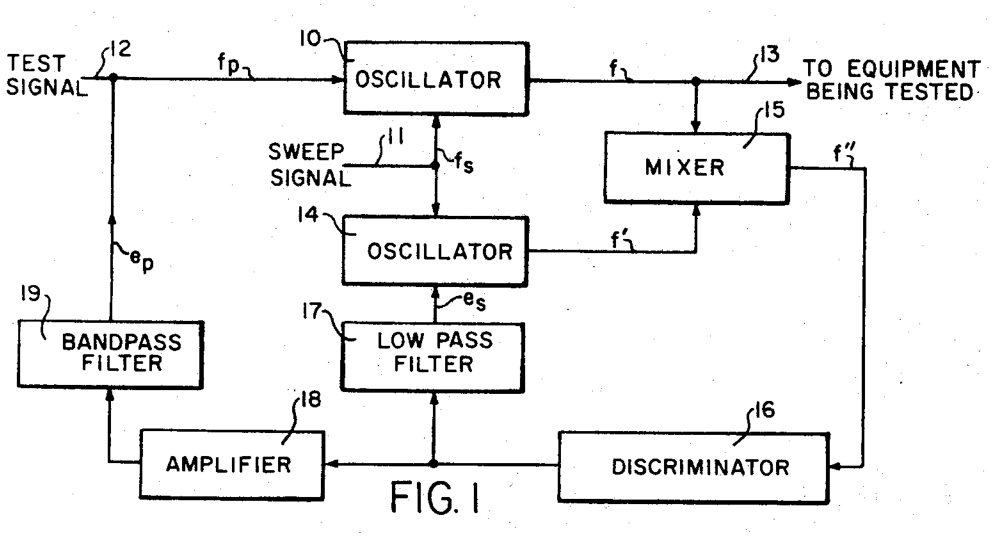
FIG. 1 is a block diagram of the signal generator of this invention.

In FIG. 1, the oscillator 10 has a sweep signal input 11 and a test signal input 12. For example, for testing intermediate-frequency circuits of a transmission system, the center frequency of the oscillator 10 may be 70 mHz. and a sweep signal voltage having a frequency $f_s$ of 16 Hz. may sweep the oscillator signal over a range from 40–100 mHz. A test signal may have a frequency $f_p$ of 200 kHz. and impose frequency modulation (usually to the extent of a modulation index lower than one) upon the swept signal. The composite signal is applied through output conductor 13 to the system being tested.

An oscillator 14, a mixer 15, a discriminator 16, and output control circuits connected to the discriminator form a negative feedback circuit connected to the test signal input of the oscillator 10. In this circuit arrangement, wide-band, high-frequency circuits are not required. A negative feedback voltage is derived for controlling the amplitude of the test signal applied to the input conductor 12 so that constant deviation at the frequency of the test signal is attained throughout the sweeping range of the oscillator 10. The versatility and accuracy of the oscillator 10 is dependent upon this feedback circuit.

The output of each of the oscillators 10 and 14 is connected to a respective input of the mixer 15, and the output of the mixer 15 is connected to the input of the discriminator 16. A low-frequency component of the discriminator output at the sweep frequency $f_s$, for example, 16 Hz., is utilized to control the frequency of the oscillator 14, and a higher frequency component at the test frequency $f_p$ is utilized as negative feedback signal for application to the test signal input of the oscillator 10. Accordingly, the output of the discriminator is applied through the low-pass filter 17 to the frequency-control circuit of the oscillator 14 and is also applied through the amplifier 18, the bandpass filter 19, through a usual feedback voltage divider (not shown) to the test signal input 12 of the oscillator 10.

The discriminator has a center frequency $f''$ at which its output is zero. When the frequency, that is the difference in the frequencies of the two oscillators, departs from the frequency $f''$, for example, 10 mHz., at the output of the mixer 15, the discriminator develops voltage for changing the frequency of the oscillator 14 so that it tracks the frequency of the oscillator 10 with an offset frequency $f''$.

Figure 2:
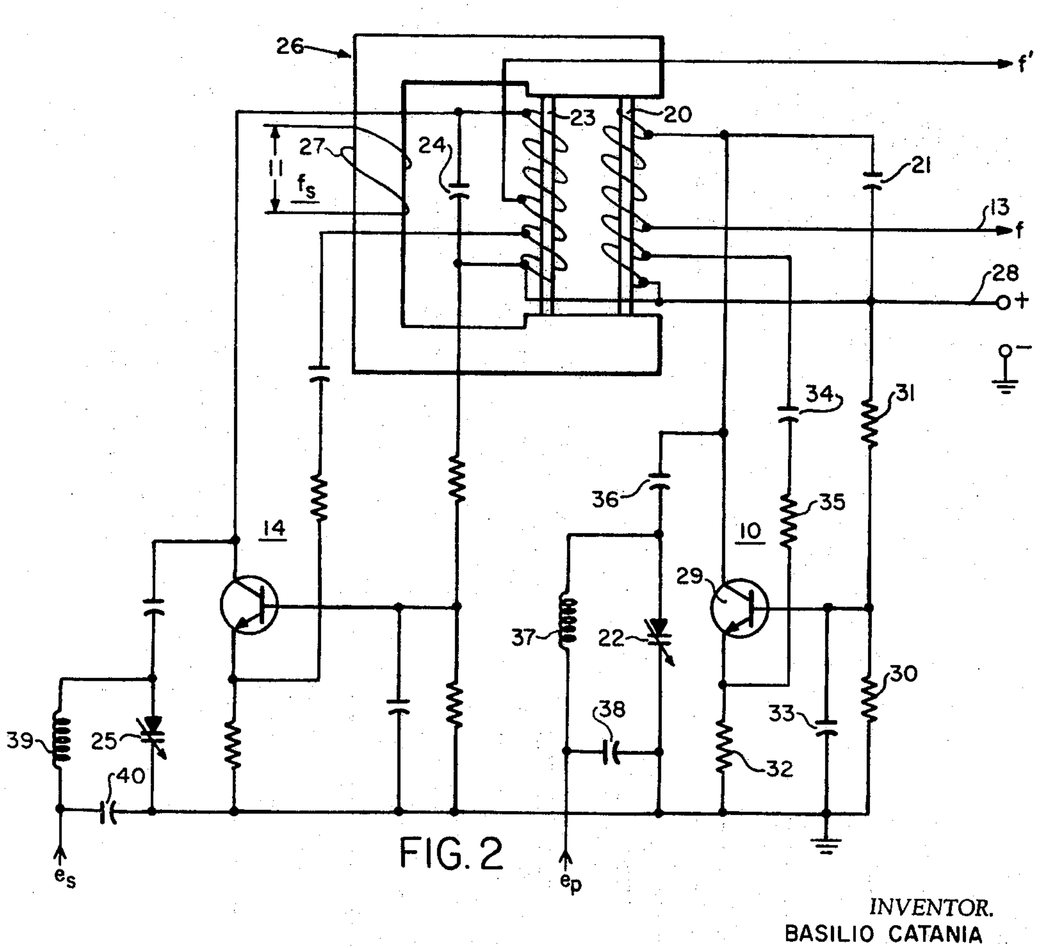
FIG. 2 is a schematic diagram of the two oscillators of the signal generator of FIG. 1 showing their synchronous sweeping circuits.

Although the sweeping of the oscillator 14 might be controlled only by voltage derived from the discriminator 16, closer control of frequency results when the oscillator 14 is coupled to the sweep circuit of oscillator 10 as shown in the block diagram of FIG. 1 and in detail in FIG. 2. The frequency of the oscillator 10 is determined by a resonant circuit comprising a ferrite-core inductor 20, a capacitor 21, and a variable capacitance diode 22; and likewise, the frequency of the similar oscillator 14 is determined by a ferrite-core inductor 23, a capacitor 24, and a diode 25. Each ferrite-core inductor is placed within the field of a silicon steel laminated core inductor 26 as induced by sweep current in its winding 27. A source of sweep signal is connected to the input 11 of the winding 27 to sweep the frequencies of the oscillators 10 and 14 in unison. A control voltage at a frequency $f_p$ as derived from an external test signal generator and controlled by the output of the discriminator 16 is applied to the variable-capacitor diode 22 to superimpose a frequency-modulated test signal on the sweep signal present at the output of the oscillator 10. A control signal at the frequency $f_s$ is applied to the variable-capacitor diode 25 to correct the sweep frequency of the oscillator 14 so that the output of the mixer is maintained very close to a center frequency $f''$.

Other than the sweep frequency and modulation circuits, the connections to the transistors of the similar oscillators 10 and 14 are conventional. For example, in oscillator 10, a source of positive voltage is applied to a conductor 28, through the entire winding of the inductor 20 to the collector of a type NPN transistor 29. The base of the transistor 29 is connected to a usual voltage divider comprising resistors 30 and 31 connected in series between the positive conductor 28 and a common conductor or ground. The base is bypassed to ground by a capacitor 33. The emitter of the transistor 20 is connected through a biasing and load resistor 32 to the common conductor. The emitter is also connected through a resistor 35 and a capacitor 34 to a tap on the winding of the inductor 20. The output conductor 13 of the oscillator 10 for supplying signal at a frequency $f$ is connected to a tap of the inductor 20, and likewise the output conductor for supplying signal at frequency $f'$ is connected to a tap on the inductor 23 of the oscillator 14.

Tuning of the oscillator 10 is accomplished by adjusting or selecting the capacitor 21 and by applying voltage $e_p$ at the frequency $f_p$ of the test signal to the variable capacitance diode 22. The capacitor 21 is connected directly across the winding of the inductor 20, and one electrode of the diode 22 is connected through a coupling capacitor 36 to that outer terminal of the winding of the inductor 20 which is connected to the collector of the transistor 29; the other electrode of the diode 22, by being connected to ground, is effectively connected to the other outer terminal of the winding. One terminal of an inductor or choke coil 37 is connected to the junction of the coupling capacitor 36 and the variable capacitance diode 22, and the other terminal is connected to a source of test signal $f_p$, and to the negative feedback circuit at the output of the bandpass filter 19 of FIG. 1. The latter terminal is also bypassed to ground through a filter capacitor 38. This choke and capacitor filter must pass voltages $e_p$ at the test signal frequencies. The circuit of the oscillator 14 is similar, but the filter comprising a capacitor 40 and a choke coil 39 connected to the variable capacitance diode 25 is required to pass only low-frequency voltages $e_s$ at the sweep frequency $f_s$.

The operation of the signal generator may be better understood from a description of adjustments of a generator at typical frequencies for testing intermediate-frequency circuits of communication systems. The adjustment includes the following steps:

(1) While only the oscillator 10 is operating and a sweep frequency signal $f_s$ of 16 Hz. is applied to its input conductor 11, adjust the capacitance of the capacitor 21 and the amplitude of the signal $f_s$ to obtain a generator output signal that is swept from 40 mHz. to 100 mHz.

(2) While oscillators 10 and 14 are operating but without application of signal $e_s$ from the low-pass filter 17 to the frequency control circuit of the oscillator 14, adjust the capacitance of the capacitor 24 until the oscillator 14 is operating at a center frequency of about 80 mHz. The oscillator 14 will then likely be sweeping from about 45 mHz. to 115 mHz.

(3) Close the frequency control circuit to apply voltage $e_s$ to the frequency control circuit of the oscillator 14.

When the center frequency of the discriminator 16 is 10 mHz., the difference frequency at the output of the mixer 15 is kept at $$10\text{ mHz.}\pm\frac{5\text{ mHz.}}{\text{loop gain}}$$

and, assuming the gain of the negative feedback loop to be 1000, the difference frequency is maintained within 5 kHz. of 10 mHz. The discriminator and amplifiers in the feedback circuit are flat within 1 decibel over a bandwidth of 2 mHz. so that nonlinearity or cross modulation of the test signal $f_p$ with the sweep signal $f_s$ is negligible.

When separate oscillators are used for sweep signals and for frequency-modulated signals, a conventional sweep oscillator is used to perform reflection coefficient tests, gain tests, and bandwidth tests; whereas, for linearity tests and group delay distortion (phase) tests, a frequency-modulated oscillator that permits wide settings of the center frequency is used. By using the signal generator of the present invention, amplitude or gain and group delay tests of transmission circuits such as intermediate-frequency circuits can be performed during a single test connection. Likewise phase and return loss characteristics of an equalizer are readily made. In this manner, the transmission characteristics for the different tests remain the same.

Although the test generator of this invention has been described with reference to a particular embodiment, the generator may be changed in ways obvious to those skilled in the art without departing from the true spirit and scope of the invention.

What is claimed is:

1. A signal generator having first and second oscillators, a test frequency control circuit connected to said first oscillator for frequency modulating the output thereof, a sweep frequency control circuit also connected to said first oscillator for sweeping the center frequency of the frequency modulated output over a wide frequency range, means for synchronizing the frequency of said second oscillator with the frequency of signal generated by said first oscillator operative to maintain the difference in frequency between the signal of the second oscillator and said swept center frequency constant, a mixer connected to the output of each of said oscillators for deriving the difference frequency in its output, and a discriminator and bandpass filter connected serially from said mixer output to said test frequency control circuits in a negative feedback arrangement, said bandpass filter passing feedback signal within the range of frequencies of signals applied to said test frequency control circuit.

2. A signal generator as claimed in claim 1, wherein said second oscillator has a frequency control circuit responsive to voltage change to change its frequency, and said means for synchronizing includes a low-pass filter connected between the output of said discriminator and said frequency control circuit, said low-pass filter passing voltages at the frequency of sweep signal applied to said sweep frequency control circuit.

3. A signal generator as claimed in claim 2, wherein said sweep frequency control circuit is connected to both of said oscillators.

4. A signal generator as claimed in claim 3, wherein said sweep frequency control circuit includes an inductor for each of said oscillators, an input circuit responsive to application of sweep signal for varying simultaneously the magnetic fields of said inductors, said test frequency control circuit includes a first variable capacitance diode connected across said inductor of said first oscillator, and said frequency control circuit responsive to voltage includes a second variable capacitance diode connected across said inductor of said second oscillator.

References Cited

UNITED STATES PATENTS

| | | | |
|---|---|---|---|
| 2,794,956 | 6/1957 | Fox | 331—30 X |
| 3,221,266 | 11/1965 | Vitkovits | 331—30 X |

ROY LAKE, *Primary Examiner.*

S. H. GRIMM, *Assistant Examiner.*